US009589035B2

(12) United States Patent
Desai et al.

(10) Patent No.: US 9,589,035 B2
(45) Date of Patent: Mar. 7, 2017

(54) STRATEGIES FOR RESULT SET PROCESSING AND PRESENTATION IN SEARCH APPLICATIONS

(71) Applicant: International Business Machines Corporation, Armonk, NY (US)

(72) Inventors: Rajesh M. Desai, San Jose, CA (US); Magesh Jayapandian, San Jose, CA (US); Aidon P. Jennery, El Sobrante, CA (US); Justo L. Perez, Salinas, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/195,805

(22) Filed: Mar. 3, 2014

(65) Prior Publication Data
US 2015/0248464 A1    Sep. 3, 2015

(51) Int. Cl.
*G06F 7/04* (2006.01)
*G06F 17/30* (2006.01)

(52) U.S. Cl.
CPC .. *G06F 17/30554* (2013.01); *G06F 17/30011* (2013.01); *G06F 17/30345* (2013.01);
(Continued)

(58) Field of Classification Search
CPC ......... G06F 17/30864; G06F 17/30011; G06F 17/30345; G06F 17/30386; G06F 17/30554; G06F 17/30
See application file for complete search history.

(56) References Cited

U.S. PATENT DOCUMENTS 6,633,867 B1 * 10/2003 Kraft ................. G06F 17/30867
705/26.1
8,090,705 B1    1/2012 Panse
(Continued)

FOREIGN PATENT DOCUMENTS

WO    2009078720 A1    6/2009
WO    2012135720 A2    10/2012

OTHER PUBLICATIONS

Nguyen, QL.; "Towards an Archive Place for Disseminating Digital Records"; Archiving 2012, pp. 141-146, Society for Imaging Science and Technology; 2012.
(Continued)

*Primary Examiner* — Bruce Moser
(74) *Attorney, Agent, or Firm* — North Shore Patents, P.C.; Michele Liu Baillie (57) ABSTRACT

In searching electronic documents, prior to executing a query, a reviewer indicates whether a result set of the query will be dynamic or static. The query is then executed on the electronic documents to obtain an original result set, which is provided to the reviewer through a user interface. Upon determining that one or more changes to one or more of the electronic documents have occurred, and if the result set is static, then the original result set continues to be provided to the reviewer without re-executing the query. If the result set is dynamic, then the query is re-executed on the electronic documents to obtain an updated result set, and the updated result set is provided to the reviewer through the user interface. The original result set may be associated with a search session and/or may be a random sample of the electronic documents for an overview query.

9 Claims, 3 Drawing Sheets

(52) U.S. Cl.
CPC .. *G06F 17/30386* (2013.01); *G06F 17/30516* (2013.01); *G06F 17/30864* (2013.01)

(56) References Cited

U.S. PATENT DOCUMENTS

| | | | | |
|---|---|---|---|---|
| 8,560,509 | B2* | 10/2013 | Xia | G06F 17/30902 |
| | | | | 707/696 |
| 9,058,392 | B1* | 6/2015 | Pennock | G06F 17/30867 |
| 9,129,018 | B2* | 9/2015 | Kohavi | G06F 17/30864 |
| 9,135,358 | B2* | 9/2015 | Campbell | G06F 17/3089 |
| 2004/0243555 | A1* | 12/2004 | Bolsius | G06F 17/30471 |
| 2006/0080288 | A1* | 4/2006 | MacLaurin | G06F 17/30067 |
| 2007/0282797 | A1* | 12/2007 | Wang | G06F 17/30867 |
| 2009/0150906 | A1* | 6/2009 | Schmidt | G06F 17/30011 |
| | | | | 719/317 |
| 2010/0332513 | A1* | 12/2010 | Azar | G06F 17/30469 |
| | | | | 707/769 |
| 2013/0018916 | A1 | 1/2013 | Busch et al. | |
| 2014/0229462 | A1* | 8/2014 | Lo | G06F 17/30528 |
| | | | | 707/707 |
| 2015/0006578 | A1* | 1/2015 | Cunningham | G06F 17/30899 |
| | | | | 707/775 |

OTHER PUBLICATIONS

Ghosh, K.; "Improving E-discovery using Information Retrieval"; Proceedings of the 35th Annual International ACM SIGIR Conference on Research & Development in Information Retrieval (SIGIR 2012), 996, ACM; 2012.

Zhu, X. et al.; "Method and System for Searching Documents Using Positional Models"; An IP.com Prior Art Database Technical Disclosure; http://ip.com/IPCOM/000206536D; Apr. 29, 2011.

Internet Society et al.; "Contexts for IMAP4"; An IP.corn Prior Art Database Technical Disclosure; http://ip.com/IPCOM/000172967D; Jul. 23, 2008.

Liu, B., et al; "DataLens: Making a Good First Impression"; SIGMOD 2009; Providence, Rhoade Island, US; Jun. 29, 2009.

Bar-Yossef, Z. et al; "Random Sampling from a Search Engine's Corpus"; 15th International World-Wide Web Conference; Aug. 23, 2006.

* cited by examiner

STRATEGIES FOR RESULT SET PROCESSING AND PRESENTATION IN SEARCH APPLICATIONS

BACKGROUND

In a typical search application, such as an electronic discovery (e-discovery) application deployment, enterprise documents are archived in one or more repositories. In the case of an e-discovery application, if any litigation requires a subset of these documents to be produced, the underlying repository is queried for documents relevant to the litigation and these are then collected and produced as evidence. Retrieval of relevant documents is typically a multi-step process requiring multiple iterations. The initial query to a repository may be broad and would return a large set of documents that matches the query predicates. The returned documents are then put into a case created for the corresponding litigation. However, not all documents in the case may be relevant to the litigation, so before producing documents as evidence, further analysis is often needed. Different levels of review are carried out by reviewers of varying roles and levels of expertise to identify relevant and irrelevant documents. Reviewers might be assigned to different tasks in reviewing the documents. Analysis of a case could involve issuing more queries, some of which could be complex Boolean-logic queries. After multiple iterations of such reviews, the final set of documents to be produced as evidence is compiled.

To facilitate a collaborative workflow in an e-discovery environment, e-discovery products provide mechanisms by which reviewers can communicate with each other about individual documents by marking and annotating the documents. At any time during the case's lifecycle, markings can be added, modified or removed by anyone with privileges to do so. Since the markings are to be searchable, they are stored in fast data structures such as inverted indexes. But unlike typical inverted indexes, they are also to be updatable and dynamic to support simultaneous indexing and searching by multiple reviewers. When document search and document annotation are allowed to occur simultaneously, the result set of a search query with annotation constraints can change while it is being traversed. While this is desirable by some reviewers, it can be a problem for others, depending on the task a reviewer is performing when the change occurs. Possibly, it could require starting over to ensure that a task is done completely and correctly.

SUMMARY

According to one embodiment of the present invention, a method for searching electronic documents in an electronic document system, prior to executing a query on the electronic documents, receives from a reviewer whether a result set of the query will be dynamic or static. The query is then executed, by a computing processor, on the electronic documents to obtain an original result set. The original result set is provided to the reviewer through a user interface. One or more changes to one or more of the electronic documents then occurs. If the result set is static, the original result set continues to be provided to the reviewer without re-executing the query.

In one aspect of the present invention, if the result set is dynamic, then the query is re-executed on the electronic documents to obtain an updated result set, and the updated result set is provided to the reviewer through the user interface.

In one aspect of the present invention, an indication is received from the reviewer that the dynamic result set is to be switched to a static result set. One or more further changes to the one or more of the electronic documents occur since the switch to the static result set. However, the updated result set continues to be provided to the reviewer without re-executing the query.

In one aspect of the present invention, the original result set is associated with a search session. The search session is defined by one or more of the following: a pre-determined period of time; a time period beginning when the reviewer logs in to the electronic document system and ending when the reviewer logs out of the electronic document system; a time period spanning multiple logins and logouts to the electronic document system; and a time period ending when a staleness threshold for the original result set is exceeded.

In one aspect of the present invention, the original result set comprise a random sample of the electronic documents in the electronic documents system.

In one aspect of the present invention, the original result set is provided to the reviewer over a plurality of view pages. When the result set is static, one or more subsequent view pages of the original result set is provided without re-executing the query.

In one aspect of the present invention, the reviewer is notified of one or more changes to the electronic documents during a review of the original result set.

System and computer program products corresponding to the above-summarized methods are also described and claimed herein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
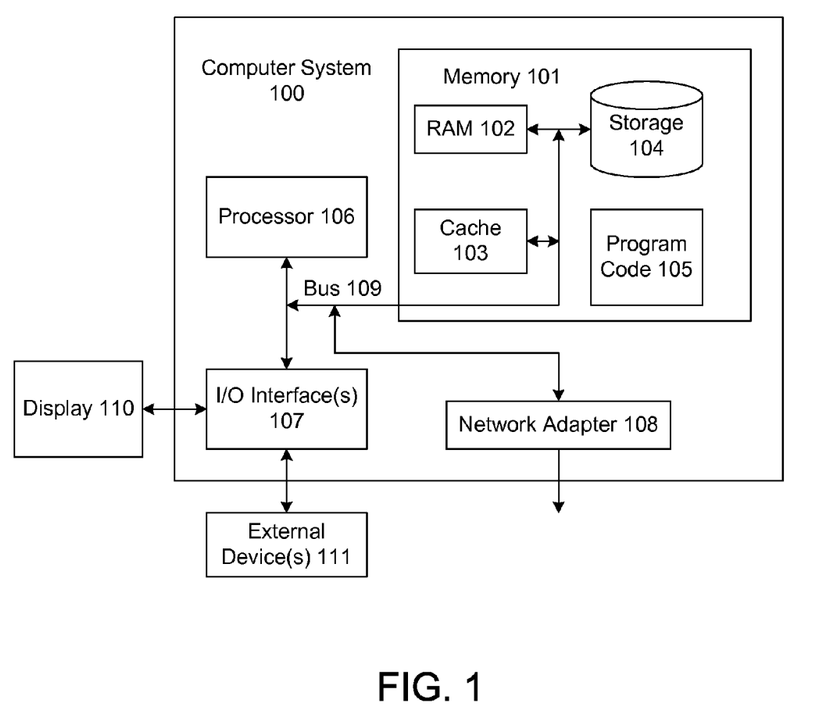
FIG. 1 illustrates a system for searching electronic documents according to embodiments of the present invention.

FIG. 1 illustrates a system for searching electronic documents according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108.

In the context of search applications like e-discovery, documents can be annotated by a reviewer and these annotations can be included as constraints in a search query. Both document annotation and document search can happen at the same time. Dynamic result sets thus can change multiple times while the reviewer who issued the query is still processing the result set. This is because the e-discovery product typically re-executes the original query whenever the reviewer changes a document's annotations, and each time, the current version of each result is retrieved. Re-execution of a query may occur when a user moves from one view page to the next in the display of the dynamic result set. Since a result set can change after re-execution, it may be difficult to correctly determine where to position the reviewer's cursor each time the search results are refreshed. Thus, the act of annotating a document in a case by a reviewer can have a negative impact on other reviewers of the case. This becomes a possibility if multiple reviewers concurrently perform annotation searches or issue queries containing one or more annotation-based constraints.

Embodiments of the present invention improves the searching of electronic documents by providing an ability for a reviewer to set a query result set as "dynamic" or "static". The embodiments are described below in the context of e-discovery documents. However, other types of electronic documents may be used without departing from the spirit and scope of the present invention.

Figure 2:
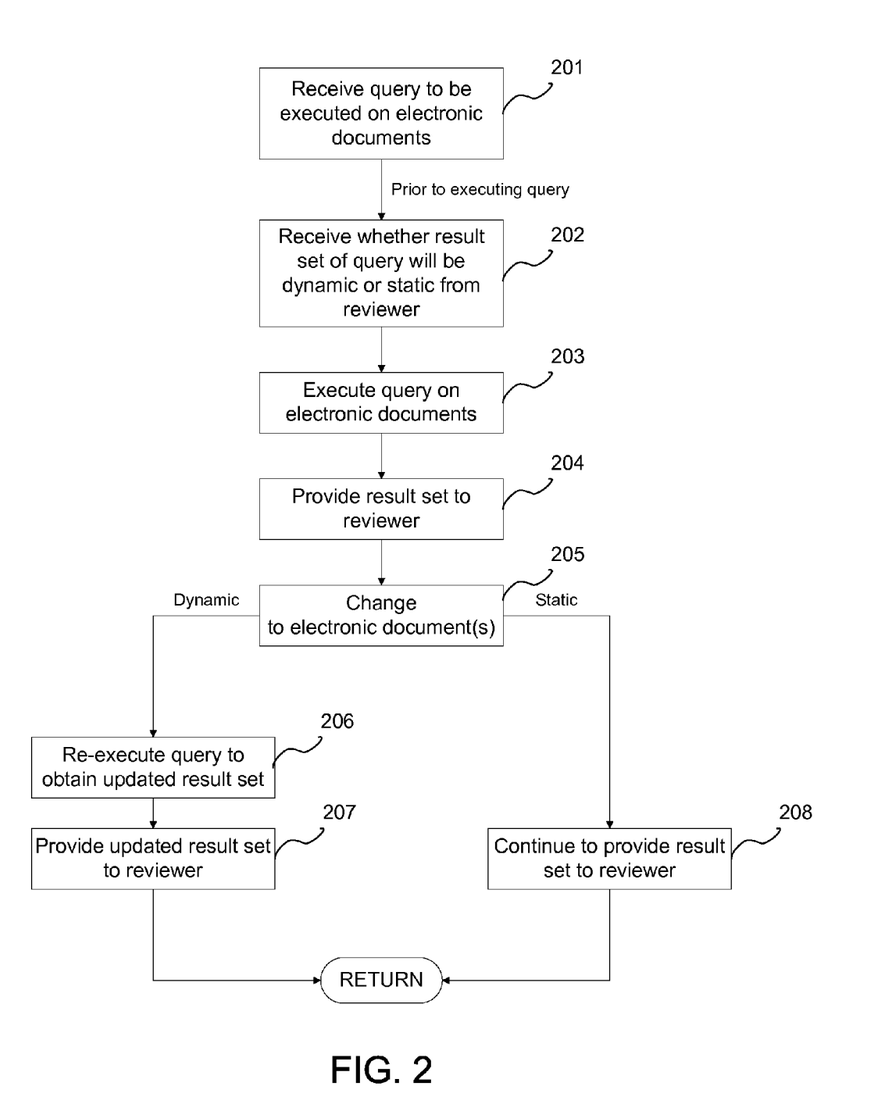
FIG. 2 is a flowchart illustrating a method for searching electronic documents according to embodiments of the present invention.

FIG. 2 is a flowchart illustrating a method for searching electronic documents according to embodiments of the present invention. The method first receives a query to be executed on a plurality of electronic documents in an electronic documents system (201). Prior to executing the query, the method receives from a reviewer a choice to set the query result set as dynamic or static (202). With a dynamic result set, the result set reflects the current state of each document satisfying the query constraints, even as annotations of the documents change. With a static result set, the result set does not change regardless of any annotation changes in any of the documents.

Dynamic result sets are suited for reviewers performing collaborative tasks. In a collaborative environment, a reviewer should be in sync with other reviewers. However dynamic result sets are not ideal for reviewers who are assigned tasks to be done independently. If other reviewers work on the same set of documents concurrently, there could be several changes to the documents included in the reviewer's result set that could cause them to lose track of where they are in their assigned task and could require them to redo parts of the task already performed. In this situation, a static result set is suitable, as it would protect the reviewer from such interference from other reviewers.

Once received from the reviewer whether the result set of the query will be dynamic or static (202), the method executes the query on the electronic documents (203). The result set is then provided to the reviewer through a user interface (204). The result set may be displayed to the reviewer as a list of documents in the result set, either on a single view page or multiple view pages. Assume that one or more changes to one or more electronic documents occur after retrieval of the result set (205). If the result set is to be dynamic, then the query is re-executed to obtain an updated result set (206), which takes into consideration the changes to the electronic documents that occurred since the original result set was obtained. The updated result set is then provided to the reviewer (207). In this manner, the dynamic result set includes a current state of the electronic documents. If the result set is to be static, then the query is not re-executed, and the method continues to provide the original result set to the reviewer (208). In this manner, the static result set does not change and does not consider any annotation changes made in the documents since the original result set was obtained.

Figure 3:
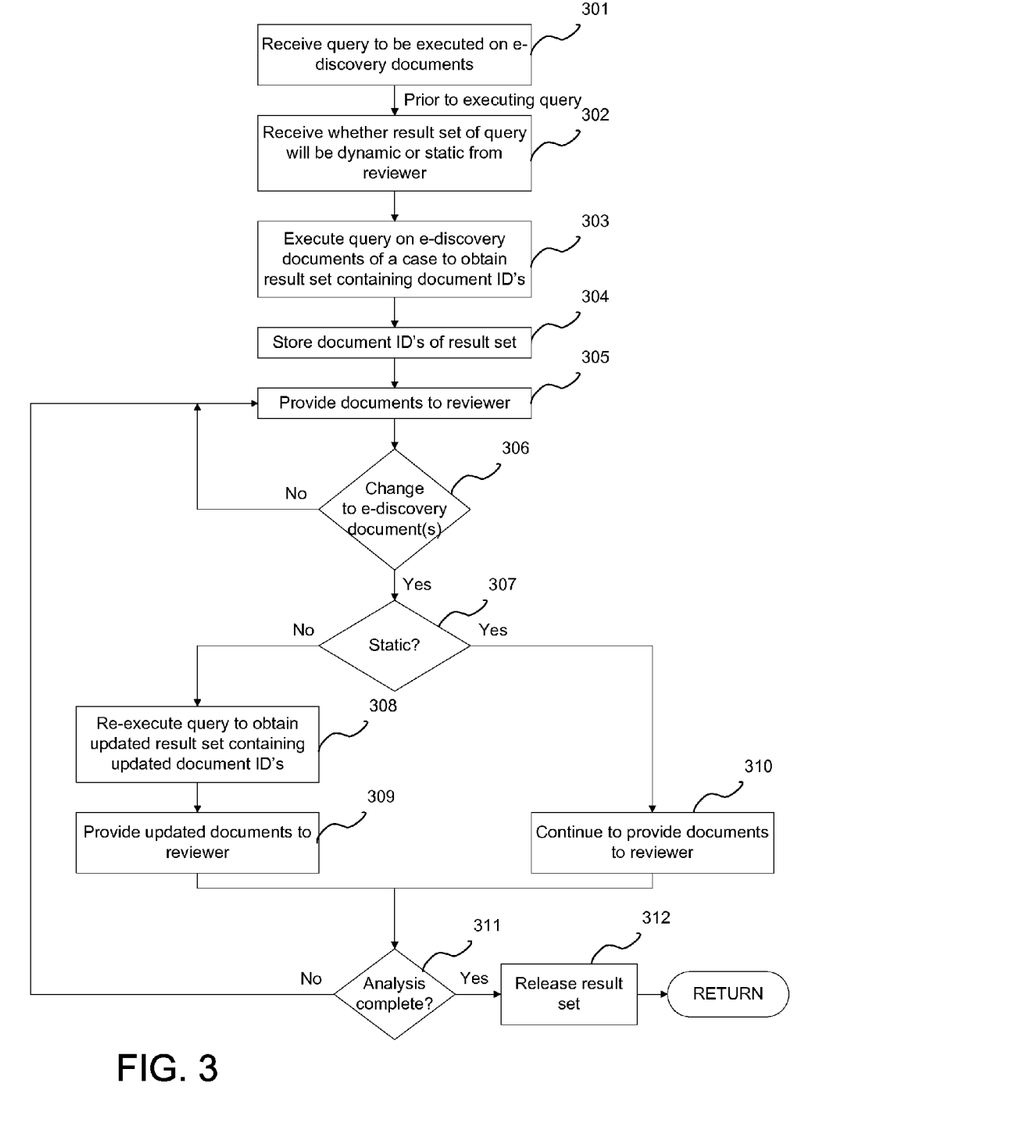
FIG. 3 is a flowchart illustrating in more detail the method for searching electronic documents according to embodiments of the present invention.

FIG. 3 is a flowchart illustrating in more detail the method for searching electronic documents according to embodiments of the present invention. In this embodiment, the electronic documents are e-discovery documents but may be any another type of electronic document. The method first receives a query to be executed on the e-discovery documents of a case (301). Prior to executing the query, the method receives from a reviewer a choice to set the query result set as dynamic or static (302). Once received from the reviewer whether the result set of the query will be dynamic or static, the method executes the query on the e-discovery documents of the case to obtain a result set containing document identifier(s) (303). In this embodiment, each document in a case has a unique document identifier within that case. When the query is executed, a result set that contains a list of document identifiers is returned, where each document identifier points to a document in the case that matches the query. The document identifiers of the result set are then stored (304), and the documents are provided to the reviewer through a user interface (305). When change(s) to one or more electronic documents in the case occur (306), and the result set is to be dynamic (307), then the query is re-executed to obtain an updated result set containing an updated list of document identifiers (308). The updated list of document identifiers may be different from the stored list of document identifiers due to the changes in document annotations or to the documents themselves. Re-executions of the query may also be needed if the result set does not fit entirely on one view page since requests for other view pages require the query to be re-executed. The updated documents are then provided to the reviewer (309). If the result set is static (307), then the query is not re-executed, and the documents in the stored list continue to be provided to the reviewer (310). Thus, when the result set is static, the list of document identifiers is only retrieved once—when the query is executed per step 303. It is then retained or stored as part of a search session's state or as part of an HTTP request.

Steps 305-310 are repeated until the analysis is complete (311), upon which the result set is released (312). According to embodiments of the present invention, the result set may be released upon one of several conditions, including when the reviewer specifies the release of the result set, when a search session ends, and when the result set reaches a staleness threshold. If the result set is static, then its release includes the release of the stored list of document identifiers. Until the release of the static result sets, any changes made to the documents or to the documents' annotations by other reviewers would not be visible to the reviewer until the reviewer releases the static result set.

For example, the reviewer may first choose a dynamic result set (302). The query is executed on the e-discovery documents of the case to obtain the result set containing the document identifiers (303). This result set is stored (304), and the documents are provided to the reviewer (305). After one or more changes to the e-discovery document(s), the query is re-executed to obtain the updated result set containing updated document identifiers (308), and the updated documents are provided to the reviewer (309). Assume however, that the reviewer decides to switch to a static result set. Embodiments of the present invention provide a mechanism for the reviewer to indicate the switch, after which, the query is re-executed and the updated result set is stored as a static result set. Even with further changes to the e-discovery documents, the updated documents continue to be provided to the reviewer without further re-execution of the query (310).

For another example, the reviewer may first choose a static result set (302). The query is executed on the e-discovery documents of the case to obtain the result set containing the document identifiers (303). This result set is stored (304), and the documents are provided to the reviewer (305). Assume however, that sometime afterward, the reviewer decides to switch to a dynamic result set, such as when the reviewer determines the static result set may be stale. Embodiments of the present invention provide a mechanism for the reviewer to indicate the switch, after which, the query is re-executed to obtain the updated result set containing updated document identifiers (308), and the updated documents are provided to the reviewer (309). The result set would then remain dynamic unless otherwise switched to static.

In one embodiment, a search session may be defined to which the query or multiple queries are associated. An indication of result sets being dynamic or static would be applicable to the entire search session, unless the reviewer explicitly indicates otherwise. Thus if a certain task requires multiple queries to be executed, the reviewer does not have to specify the desired result set type for each query. For one example, a search session begins when a reviewer logs into the e-discovery system and ends when the reviewer logs out of the system. For another example, a session is based on a time duration set by the reviewer. For another example, the search session is defined to span multiple logins and logouts by the reviewer. A search session defined across multiple logins and logouts would keep track of the reviewer's search queries and the results of those queries throughout the entire session. Upon each login, the system could optionally display the same page of results that the reviewer was viewing before the reviewer last logged off. Intermediate results can be saved to the search session, and the reviewer can resume the search session at a later time within the search session without any loss of work. Systems that audit reviewer actions would keep track of when each search session began and ended. Optionally, the reviewer can be given the option to share the search session with another reviewer in order to share a task.

In another embodiment, to avoid static result sets becoming obsolete, the search session may be terminated when a staleness threshold is reached. For example, staleness of a result set may depend on how long a result set has been static. For another example, staleness of a result set may depend on the number of changes that has occurred for the documents in the case. The boundaries of a session can be defined via a configuration option provided to the system administrator or even to reviewers.

Embodiments of the present invention further provides a mechanism for notifying reviewers of changes made to the annotations of the documents since the execution of the query, when the reviewer selects a static result set. Although with a static result set, any changes made to the documents' annotations in the result set are not displayed to the reviewer, it may nevertheless be beneficial to the reviewer to be notified of such changes. These notifications can give the reviewer an indication of how stale the result set has become. If the reviewer determines, based on the notifications, that the result set has become too stale, the reviewer may choose to update the result set, so that changes made since the result set was first retrieved may be reflected in the updated result set. For example, the system may compute and record a checksum for the initial static result set based on the document identifiers on the list. Periodically, the query is re-executed in the background, and a checksum is computed on the retrieved results each time. By comparing checksums, changes affecting the result set can be detected. If notifications are enabled, the system can display this information in a way that doesn't interrupt the reviewer's actions.

Besides changes to annotations of case documents, the documents themselves may also change over time. New documents can be added to the case and existing documents can be modified or removed from the case. Inverted indexes, however, do not allow the documents to be modified in place. To modify a document, it must be removed from the case and the modified version must then be added back to the case. Since document identifiers may not be stable, when a document is modified, the old document identifier is released and a new identifier is assigned to the new modified document. Another aspect of inverted indexes is the need to periodically merge index segments to optimize performance of indexing and of searching. Whenever this happens, document identifiers are recycled and thus are not stable. This means that every document in the case could potentially get a new identifier. Document identifiers in a static result set can thus become stale, with a greater impact than the staleness of annotation changes. Embodiments of the present invention may notify the reviewer of changes to the documents themselves, so that the reviewer may make a determination of staleness of the result set. These document changes can be detected by retrieving and recording the version of the case's main text index, which is updated whenever such changes are made, and periodically comparing it with the last recorded version.

For example, assume that a reviewer is assigned to review all documents in a case that require a second-level review (marked 'Second-level review required') and to change the marking of the documents that are irrelevant to the case as 'Non-responsive'. The reviewer may begin the task by issuing a query for all documents in the case that have been assigned the flag 'Second-level review required'. The result of this query is the subset of documents that needs to be reviewed manually to determine whether each document is relevant to the case. If a document is irrelevant, the reviewer flags it as 'Non-responsive'. Otherwise, the document is not so flagged. After analyzing a document, the reviewer removes the 'Second-level review required' flag previously assigned to it to indicate that the document has been reviewed.

However, when other reviewers are simultaneously performing tasks involving the same flags, complications could arise. For example, a second reviewer is assigned to review all documents containing certain terms, such as "private", "confidential" and "internal use only", and to mark the documents that are confidential as 'Confidential'. If any such document requires additional review to confirm their confidentiality, the reviewer is to mark the documents with 'Second-level review required'. Thus, both tasks involve the 'Second-level review required' flag. The second reviewer is assigned to add this flag to documents, while the first reviewer is assigned to either remove this flag from documents or leave it as is. If the two tasks were performed concurrently, and the reviewers opted for dynamic result sets, the two reviewers might interfere with one other. For instance, assume that the query issued for the first task to return all documents marked 'Second-level review required' matches a thousand documents in the case and issuing the result set returns twenty pages of results with each having fifty documents. If by the time the first reviewer gets to page 12, the second reviewer marks 30 documents as requiring second level review, these 30 documents are then injected into the first reviewer's result set at potentially random page numbers. Documents listed in each page for the first reviewer now would change, possibly causing the first reviewer to become unsure how many pages of results he or she has actually completed and how many actually remain. The first reviewer may be required to revisit earlier pages in the result set to see what changed and/or may be required to re-review some documents. This confusion is avoided when both reviewers opt for a static result set.

In this embodiment, the present invention further provides an improved mechanism for providing a reviewer a result set for one or more case overview queries. With overview queries, the reviewer seeks to retrieve all or almost all documents in the case, and the reviewer is likely to only scan the first few pages of the result set. Ranking the results in some pre-determined order or sorted on the basis of some metadata field is unlikely to provide a good overview, since the initial pages of results could be very different from the rest of the case, thus skewing the result set. Ranking the documents by relevance to the search query, such as that done by many search engines, increases the likelihood of the correct answer(s) being found in the first few result pages. However, this approach also fails to provide a good overview when the initial query is an overview-type of query.

The improved mechanism according to embodiments of the present invention provides a reviewer requesting a case overview with a random sample of documents from the case. The sample size can be specified by the reviewer. When the documents in the sample are too many for a single result page, a static result set is used. In typical searches of inverted indexes, if the number of documents is large, only one page is loaded at a time. Every time a new page is requested, the original search query is re-executed but only the desired page is loaded. If the result set is dynamic, each page request would return documents with changes made after the original query was first executed but before it was re-executed to retrieve this page. Since it is unlikely that two random samples returned in succession contain the same set of results, when a reviewer requests a subsequent page of the result set, it requires re-executing the query and thus creating a new random sample. The different pages could potentially have overlapping results and the case overview is no longer a single random sample but an amalgam of multiple random samples. The expectation of the sample being representative of the entire case may no longer hold true. To address this, according to embodiments of the present invention, a static result set is used instead. With a static result set, the reviewer moving from one page to another does not re-execute the original query, so the result set still constitutes a single random sample of documents. Further, providing a random sample provides a better representation of the documents in the case than a ranked sample, as the random sample gives weight to unpopular but important attributes. In addition, the random sample may serve as a starting point for further analysis of the documents in the case. The contents of the sample may provide reviewers with an idea of how the data is distributed and also a hint of what subsequent queries can be issued to improve the understanding of the case. The random samples may also be used to generate visualizations, such as tag clouds, which can in turn be used as staring points for more in-depth analyses of the case.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for searching electronic documents in an electronic document system, the computer program product comprising:
 a computer readable storage medium having computer readable program code embodied therewith, the program code executable by a processor to:
  receive an indication of whether a result set of a query will be dynamic or static;
  execute the query on the electronic documents to obtain an original result set;
  provide the original result set to a reviewer through a user interface;
  determine that one or more changes to one or more of the electronic documents have occurred;
  if the result set is static, then continue to provide the original result set to the reviewer without re-executing the query; and
  if the result set is dynamic, then:
   re-execute the query on the electronic documents to obtain an updated result set and provide the updated result set to the reviewer through the user interface;
   receive from the reviewer an indication that the dynamic result set is to be switched to a static result set;
   determine one or more further changes to the one or more of the electronic documents have occurred since the switch to the static result set; and
   continue to provide the updated result set to the reviewer without re-executing the query.

2. The computer program product of claim 1, wherein the program code is further executable by the processor to:
 associate the original result set with a search session, wherein the search session is defined by one or more of the following:
  a pre-determined period of time;
  a time period beginning when the reviewer logs into the electronic document system and ending when the reviewer logs out of the electronic document system;
  a time period spanning multiple logins and logouts to the electronic document system; and
  a time period ending when a staleness threshold for the original result set is exceeded.

3. The computer program product of claim 1, wherein the original result set comprise a random sample of the electronic documents in the electronic documents system that satisfy the query.

4. The computer program product of claim 1, wherein the original result set is provided to the reviewer over a plurality of view pages, wherein in continuing to provide the original result set to the reviewer without re-executing the query, the program code is further executable by the processor to:
 provide one or more subsequent view pages of the original result set without re-executing the query.

5. The computer program product of claim 1, wherein the program code is further executable by the processor to:
 notify the reviewer of one or more changes to the electronic documents during a review of the original result set.

6. A system comprising:
a processor; and
a computer readable storage medium having computer readable program code embodied therewith, the program code executable by the processor to:
   receive an indication of whether a result set of a query will be dynamic or static;
   execute the query on the electronic documents to obtain an original result set;
   provide the original result set to a reviewer through a user interface;
   determine that one or more changes to one or more of the electronic documents have occurred;
   if the result set is static, then continue to provide the original result set to the reviewer without re-executing the query; and
   if the result set is dynamic, then:
      re-execute the query on the electronic documents to obtain an updated result set and provide the updated result set to the reviewer through the user interface;
      receive from the reviewer an indication that the dynamic result set is to be switched to a static result set;
      determine one or more further changes to the one or more of the electronic documents have occurred since the switch to the static result set; and
      continue to provide the updated result set to the reviewer without re-executing the query.

7. The system of claim 6, wherein the program code is further executable by the processor to:
   associate the original result set with a search session, wherein the search session is defined by one or more of the following:
      a pre-determined period of time;
      a time period beginning when the reviewer logs into the electronic document system and ending when the reviewer logs out of the electronic document system;
      a time period spanning multiple logins and logouts to the electronic document system; and
      a time period ending when a staleness threshold for the original result set is exceeded.

8. The system of claim 6, wherein the original result set comprise a random sample of the electronic documents in the electronic documents system that satisfy the query.

9. The system of claim 6, wherein the original result set is provided to the reviewer over a plurality of view pages, wherein in continuing to provide the original result set to the reviewer without re-executing the query, the program code is further executable by the processor to:
   provide one or more subsequent view pages of the original result set without re-executing the query.

* * * * *